(12) United States Patent
Bader et al.

(10) Patent No.: US 6,267,215 B1
(45) Date of Patent: Jul. 31, 2001

(54) CLUTCH

(75) Inventors: Josef Bader, Friedrichshafen; Gerhard Buri, Markdorf; Stefan Renner, Bodman-Ludwigshafen, all of (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/462,008

(22) PCT Filed: Jul. 25, 1998

(86) PCT No.: PCT/EP98/04677

§ 371 Date: Dec. 29, 1999

§ 102(e) Date: Dec. 29, 1999

(87) PCT Pub. No.: WO99/06728

PCT Pub. Date: Feb. 11, 1999

(30) Foreign Application Priority Data

Aug. 2, 1997 (DE) ............................................. 197 33 519

(51) Int. Cl.⁷ ............................. F16D 23/06; F16H 3/78
(52) U.S. Cl. ........................... 192/53.34; 192/53.33; 192/114 T; 74/339
(58) Field of Search ............... 192/53.34, 53.33, 192/114 T, 48.91; 74/339; 475/303, 320

(56) References Cited

U.S. PATENT DOCUMENTS

| | | | | |
|---|---|---|---|---|
| 4,667,538 | * | 5/1987 | Larsson | 475/303 |
| 4,821,591 | * | 4/1989 | Adler | 74/339 |
| 5,292,290 | | 3/1994 | Scholz et al. | |
| 5,390,347 | * | 2/1995 | Buri et al. | 475/303 |
| 5,507,376 | * | 4/1996 | Skotnicki | 192/48.91 |
| 5,544,727 | * | 8/1996 | Braun | 192/48.91 |
| 5,588,516 | * | 12/1996 | Braun et al. | 192/48.91 |
| 6,053,294 | * | 4/2000 | Olsson | 192/53.31 |

FOREIGN PATENT DOCUMENTS

| | | |
|---|---|---|
| 19 65 844 | 7/1971 | (DE) . |
| 34 44 562 | 6/1985 | (DE) . |
| 0 184 077 | 6/1986 | (EP) . |
| 0 423 863 A | 4/1991 | (EP) . |
| 0 638 739 A1 | 2/1995 | (EP) . |
| 0 663 541 A | 7/1995 | (EP) . |
| 24 66 668 A1 | 4/1981 | (FR) . |
| 92 01173 A | 1/1992 | (WO) . |

* cited by examiner

Primary Examiner—Charles A Marmor
Assistant Examiner—Saúl Rodriguez
(74) Attorney, Agent, or Firm—Davis & Bujold, P.L.L.C.

(57) ABSTRACT

The invention concerns a clutch (1) comprising a sliding sleeve (17) with selector teeth (19), two synchronizing rings (28, 29) situated on either side of the sliding sleeve (17) with locking teeth (30, 31) and friction surface (24, 25) which can be turned about a limited rotation angle in relation to the sliding sleeve (17) and two clutch bodies (20, 21) with clutch teeth (22, 23) and counter friction surface (26, 27), the clutch bodies (20, 21) interacting with the synchronizing rings (28, 29) wherein the sliding sleeve (17) is constantly connected with a gear element (3) in a way torsionally resistant and when engaged is connected to one of the clutch bodies (20, 21) via the selector teeth (19) and the clutch teeth (22, 23) with positive fit. In order to make possible a limited rotation angle between the sliding sleeve (17) and the synchronizing rings (28, 29) in a specifically narrow, externally guided, sliding sleeve (17), it is proposed that the synchronizing rings (28, 29) have several cams (32, 33) distributed over the periphery which engage in grooves (44) of the externally guided sliding sleeve (17) with a clearance thus defining the limited rotation angle, some of the cams (32) of one synchronizing ring (28) extending into the area of the other synchronizing ring (29) and vice versa.

7 Claims, 3 Drawing Sheets

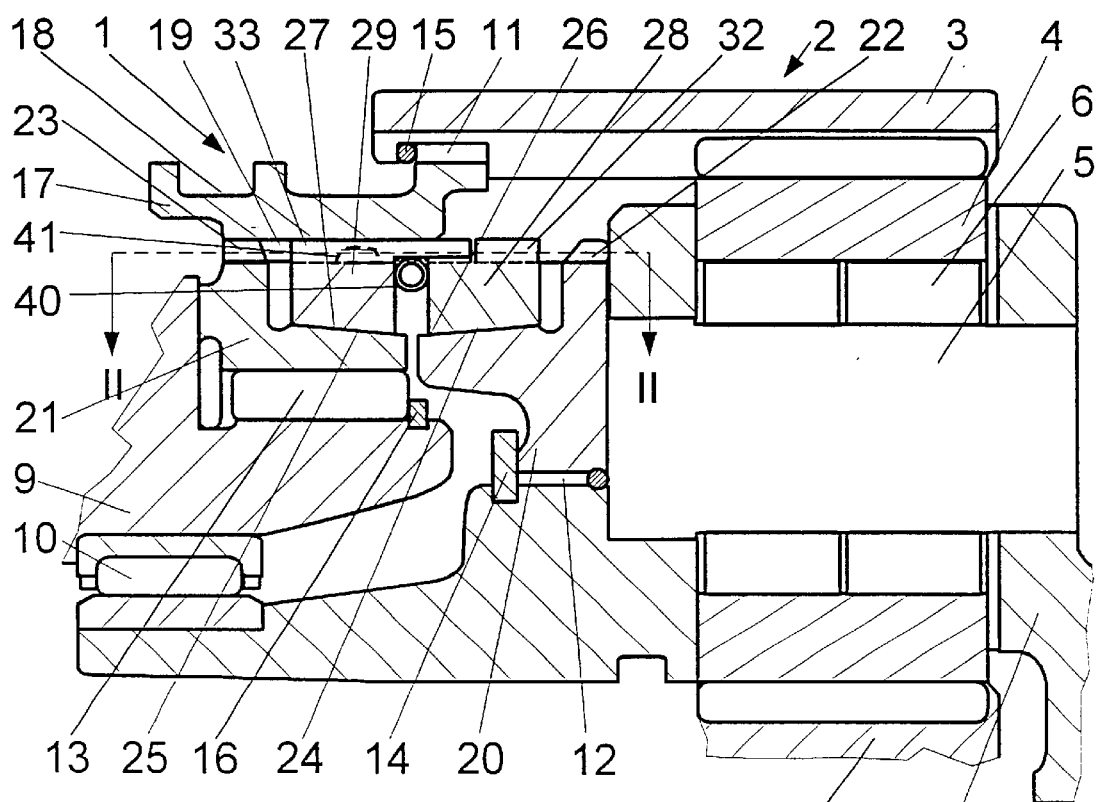
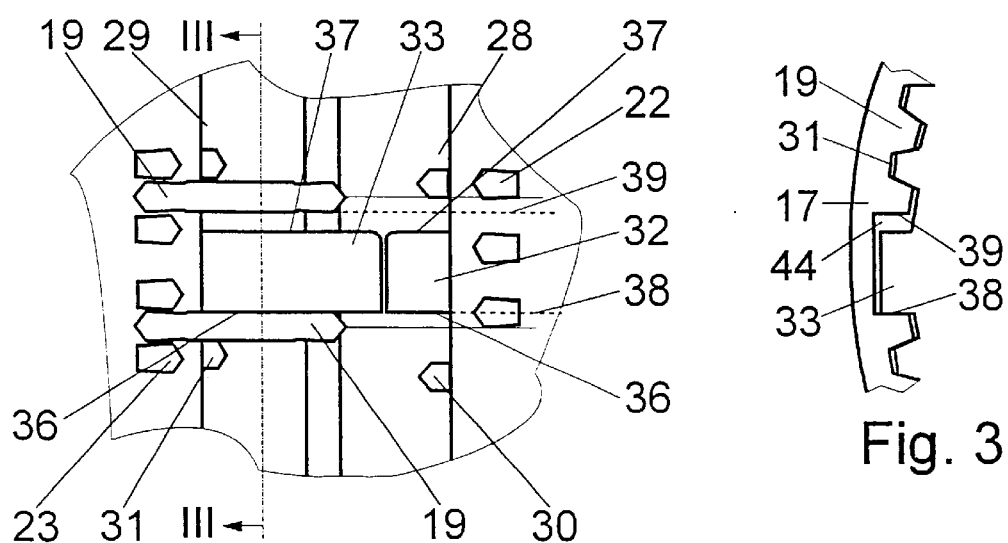
Fig. 1
Fig. 2
Fig. 3

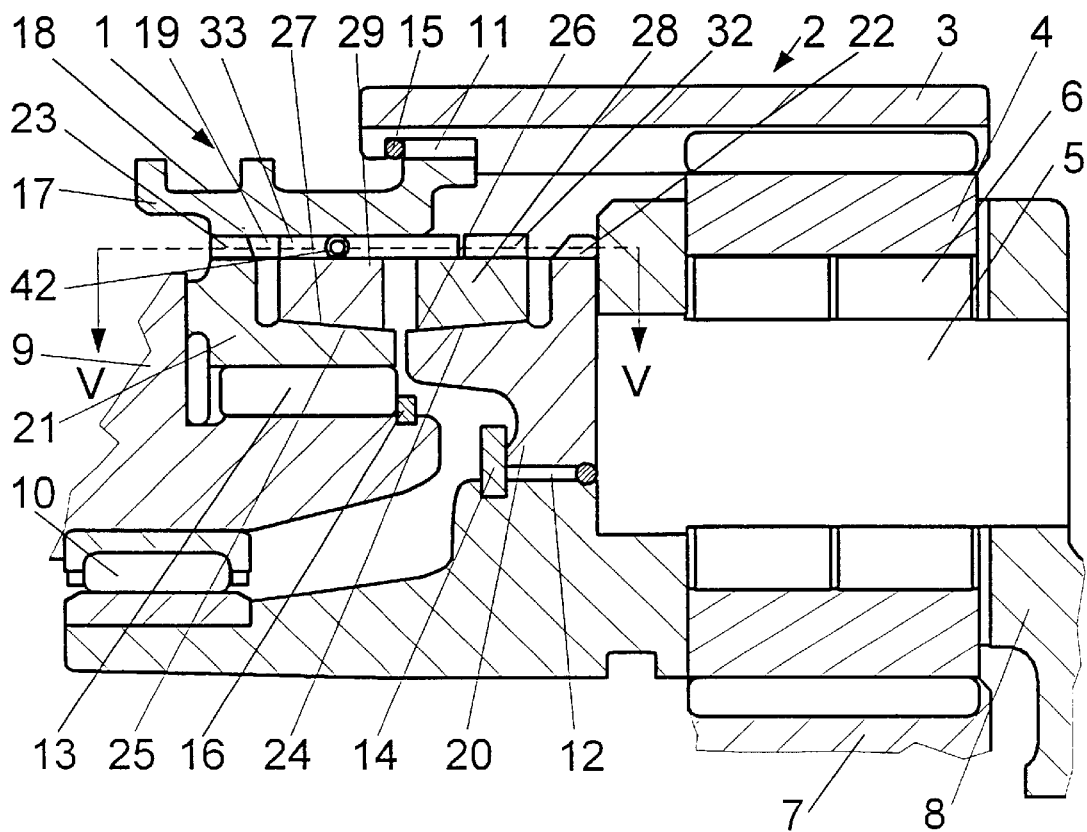
Fig. 4
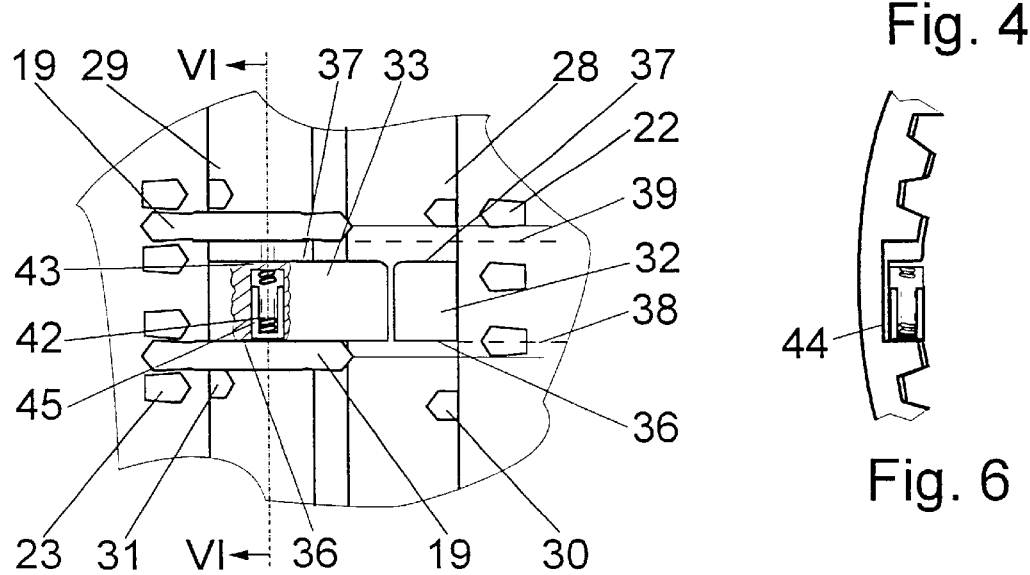
Fig. 5
Fig. 6

CLUTCH

BACKGROUND OF THE INVENTION

The invention concerns a clutch.

In selector gears which are shifted subject to interruption of traction force, i.e. one input shaft is separated from a prime mover by a clutch during the shifting operation, the desired gear can be engaged with a clutch of the above described type by slipping the selector teeth of a sliding sleeve into clutch teeth of a clutch body which is secured to a transmission element to be engaged such as a gearwheel or transmission housing. When engaged, the torque is transmitted from one gear element to another gear element, such as a gear wheel or shaft via the clutch body, the clutch teeth, the selector teeth, the sliding sleeve and the sleeve guide, or supported on the transmission housing. The gear engaged determines the reduction ratio and thus the rotational speed ratio between the input shaft and output shaft of the transmission. The transmission elements not engaged, e.g. the gear wheels of the remaining gears that rotate freely and are permanently engaged, rotate at a differential rotational speed corresponding to their ratio in relation to the transmission elements engaged. When shifting from one gear to another, the parts to be engaged have to be brought during the shifting operation to an almost equal rotational speed before the selector teeth of the sliding sleeve can mesh in the clutch teeth of the clutch body to be shifted.

A synchronizer mechanism serves this purpose. Essentially it consists of friction surfaces, such as a friction cone on the clutch body and friction surfaces such as a counter cone on a synchronizing ring, which in addition, has locking teeth. The synchronizing ring revolves with the sliding sleeve, but can rotate relative to it around a limited rotation angle between two stops in order that a locking device, such as locking teeth, is brought to locking position on the synchronizing ring.

If the sleeve is moved in the direction of the clutch body to be engaged, the synchronizing ring with its counter cone is pressed, via resilient detent means, against the friction cone of the clutch body. At the same time, the synchronizing ring turns relative to the sleeve so that frontside inclined surfaces of the selector teeth hit on corresponding locking surfaces of the locking teeth. Thereby an axial force is exerted on the synchronizing ring and the friction surfaces. The selector force simultaneously produces, via the inclined surfaces, a restoring force on the synchronizing ring. The force exceeds, during synchronous speed of the parts, the peripheral force acting on the friction surfaces and brings the synchronizing ring to a central position in which the sleeve can be cut through.

EP 0 184 077B1 has made known such selector clutches in particular for transmissions in countershaft design. The sliding sleeve is here movably disposed upon an inner sleeve carrier and the synchronizing rings are rotatably axially guided opposite the sleeve carrier around a rotation angle limited by stops. In addition, tangential springs are disposed between the sleeve carrier and the synchronizer ring in a manner such as to press both parts against their stops into neutral position contrary to the direction of motion.

DE 34 44 562 has disclosed a clutch for a planetary step which has synchronizing rings without locking teeth. The synchronizing rings mesh with engaging gears almost over the whole axial extent in the selector teeth of the sliding sleeve without allowing a limited angle of rotation.

The problem on which the invention is based is to make possible in clutches, a locking synchronization even when the sliding sleeve is guided on its external periphery and is very narrow.

SUMMARY OF THE INVENTION

According to the invention, the synchronizing rings mesh with cams in grooves of the sliding sleeve and this with a clearance such as to allow a limited rotation angle between the synchronizing rings and the sliding sleeve in order that locking teeth can be brought to a locking position on the synchronizing rings. In order that in a shift position the sliding sleeve, especially when it is too narrow, does not become disengaged with the cams of the other synchronizing ring, a few of the cams conveniently evenly distributed on the periphery are lengthened toward the other synchronizing ring and reach into the area of the other synchronizing ring over the gap between the synchronizing rings.

The cams of the two synchronizing rings conveniently mesh in equal grooves of the sliding sleeve, the cams of one synchronizing ring being lengthened by the same amount as the cams of the other synchronizing ring are shortened.

There is also the possibility that the cams, which mesh into a groove, do not lie obtusely opposed but are lengthened over part of their extension in peripheral direction and have bearing surfaces toward the lengthened part of the other cam. As this coupling is obtained the locking teeth of one synchronizing ring is moved to a locking position as soon as the locking teeth of the other synchronizing ring leave the way clear when shifting. Thereby the sliding sleeve cannot be moved unhindered from one shift position to the other shifting position without hitting on the locking teeth of the corresponding synchronizing ring.

Since the coupling members are mechanically firmly connected with the synchronizing rings, no vibration or tension of the synchronizer device generates as is the case, e.g. in spring elements.

The synchronizing rings can be brought to locking position while the sliding sleeve axially acts upon them via detent elements, such as a ring spring, and their friction cone presses against a counter cone on the clutch body. Due to the friction force acting in peripheral direction, the synchronizing ring is turned around the limited rotation angle so that the further shift stoke of the sliding sleeve is blocked by the locking teeth up to the synchronous rotational speed of the transmission parts to be coupled. The ring spring is designed axially very narrow so that the lengthened cams have only a small gap to bridge.

According to another development of the invention, the synchronizing rings are retained in locking position up to the end of the synchronization by tangential springs which act between the cams of the synchronizing rings or between the cams of the synchronizing rings and the groves of the sliding sleeve. Hereby the ring spring can be eliminated and the intermediate space between the synchronizing rings is reduced to a minimum. Besides, the synchronizing ring has to be turned only in one direction so that half a torsion angle results. Accordingly, the locking teeth have to be inclined only on one side and the teeth can be reinforced.

In the specification and in the claims, numerous features are shown and described related to each other. The expert will conveniently regard the combined features also separately, according to the problems to be solved, and make with them logical added combinations.

DESCRIPTION OF THE DRAWINGS

One embodiment of the invention is shown in the drawing in which:

FIG. 1 is a partial longitudinal section through an inventive clutch with a tangential spring;

FIG. 2 is a partial development of a cylindrical section according to lines II—II in FIG. 1;

FIG. 3 is partial cross-section according to line III—III of FIG. 2;

FIG. 4 to FIG. 6 is a design like that of FIG. 1 and 2 but with a tangential spring.

DESCRIPTION OF THE PREFERRED EMBODIMENTS

Figure 7:
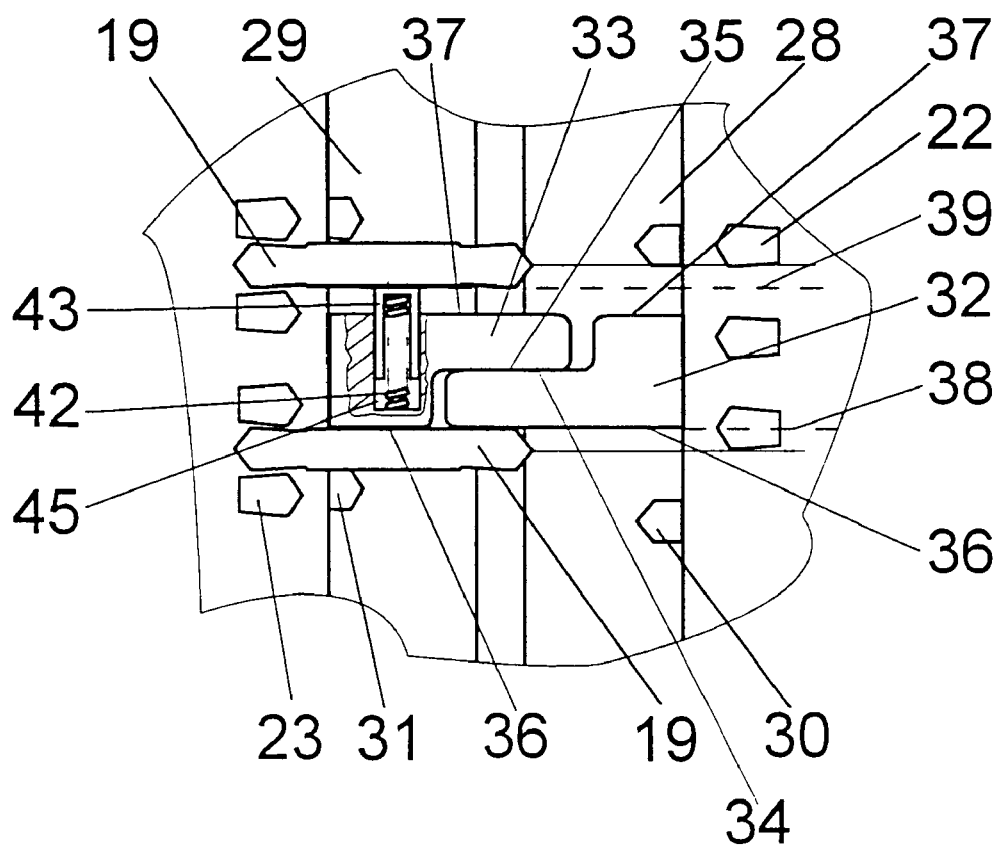
FIG. 7 is a design with engaged synchronizing rings in a representation as in FIG. 5.

A clutch 1 serves to shift a planet step 2 which comprises a ring gear 3, planetary gears 4 and a sun gear 7. The planetary gears 4 are supported in a planet carrier 8 on planetary bolts 5 by means of anti-friction bearings 6. The sun gear 7 is connected with an input shaft, not shown in detail, and the planet carrier 8, which is supported on a transmission housing 9 by means of anti-friction bearings 10, with an output shaft, not shown in detail.

Clutch 1 has a sliding sleeve 17 with a groove 18 for a shift fork, not shown in detail. It also has selector teeth 19. In the state appearing in the drawing, the selector teeth 19 mesh by locking teeth 31 of a synchronizing ring 29 in clutch teeth 23 of a clutch body 21.

The sliding sleeve 17 is non-rotatably connected via engaging teeth 11 with the ring gear 3 which, at the same time, serves for guiding the sliding sleeve 17. The sliding sleeve 17 is axially secured in the ring gear 3 by a guard ring 15. The clutch body 21 is fixed in a transmission housing 9 via engaging gears 13 and a guard ring 16. In the state appearing in the drawing the ring gear 3 is thus connected with the transmission housing 9 via the sliding sleeve 17 and the clutch body 21.

To the clutch 1 also belongs one other clutch body 20 with clutch teeth 22 which are fixed on the planet carrier 8 via engaging gears 12 and a guard ring 14 and interacts with a synchronizing ring 28. If according to FIG. 1, the sliding sleeve 17 is moved to the right, it becomes changed to another gear or transmission group in which the ring gear 3 is connected with the planet carrier 8 and rotates together with it.

The synchronizing rings 28, 29 have several, six as a rule, cams 32, 33 distributed over the periphery and radially meshing in grooves 44 of the sliding sleeve 17. The grooves 44 are wider than the cams 32, 33 so that they allow a limited rotation angle between the sliding sleeve 17 and the synchronizing rings 28, 29. The cams 32, 33 of both synchronizing rings 28, 29 conveniently mesh in the same grooves 44 of the sliding sleeve 17 with the stops 38, 39 of which their flanks 36, 37 interact.

Some of the cams 32, 33 are axially shortened or lengthened in the area of the facing front sides, the shortened cams 32 of one synchronizing ring 28 interacting with the lengthened cams 33 of the other synchronizing ring 39 and vice versa, while the lengthened cams 32, 33 reach into the area of the other synchronizing ring 28, 29 and bridge the gap between the synchronizing rings. Thus it is ensured that even in case of narrow sliding sleeves 17 and all shift positions, the cams 32, 33 remain meshed with the grooves 44.

In the design of FIGS. 1 to 3, between the synchronizing rings 28, 29 a ring spring 40 is provided, which in neutral position of the sliding sleeve 17, meshes in a detent groove 41 of the sliding sleeve 17. When the sliding sleeve 17 is moved from the neutral position, the ring spring 40 exerts on the synchronizing rings 28, 29 an axial force which produces, via the friction cones 24, 25 and the counter cone 26, 27, peripheral forces, which bring to locking position the locking teeth 30 or 31. Other grooves, not shown, can be provided for the shift positions.

In the design of FIGS. 4 to 6, tangential springs 42 adjust the locking teeth 30 or 31 in locking position. For each synchronizing ring 28, 29 are conveniently used several tangential springs 42 evenly distributed on the periphery which are disposed between the cams 32, 33 and the sliding sleeves 17 and are passed into holes 45 in the cams 32, 33 via guide sleeves 43.

The design in FIG. 7 shows cams 32, 33 which are lengthened only over part of their width and have in the lengthened area bearing surfaces 34, 35 with which they support themselves on bearing surfaces of the cam of the other synchronizing ring. The outer flanks 36, 37 of the cams 32 or 33 make possible between stops 38, 39 a limited torsion angle. The synchronizing rings 28, 29 are coupled with each other via the cams 32, 33 in a manner such that one synchronizing ring 29 turns with its locking teeth 30, the other synchronizing ring 28 to a locking position as soon as it leaves the passage clear for the selector teeth 19 and vice versa.

If the sliding sleeve 17 is now moved to the right from the shifted position (FIG. 1), its selector teeth 19 strike upon the locking teeth 30 of the synchronizing ring 28. Thereby the synchronizing ring 28 with its friction cone 24 is pressed against the counter cone 26. Due to the front side inclination of the selector teeth 19 and of the locking teeth 30 (FIG. 2), a force component generates in the peripheral direction which turns the synchronizing ring 28 together with the locking teeth 30 out of the locking position as soon as synchronous speed is reached between the sliding sleeve 17 and the clutch body 20. During synchronous speed, the selector teeth 19 can mesh in the clutch teeth 22 of the clutch body 20 whereby the ring gear 3 is now coupled with the planet carrier 8.

REFERENCE NUMERALS 1 clutch
2 planetary step
4 planetary gear
5 planetary bolts
6 anti-friction bearing
7 sun gear
8 planet carrier
9 transmission housing
10 anti-friction bearing
11 engaging gears
12 engaging gears
13 engaging gears
14 guard ring
15 guard ring
16 guard ring
17 sliding sleeve
18 groove
19 selector teeth
20 clutch body
21 clutch body
22 clutch teeth
23 clutch teeth
24 friction cone
25 friction cone
26 counter cone
27 counter cone
28 synchronizing ring 29 synchronizing ring
30 locking teeth
31 locking teeth
32 cam
33 cam
34 bearing surface
35 bearing surface
36 flank
37 flank
38 stop
39 stop
40 ring spring
41 detent groove
42 tangential spring
43 guide sleeve
44 groove
45 hole

What is claimed is:

1. A clutch (1) comprising:

a sliding sleeve (17) being non-rotatably connectable with a transmission component (3) via at least one guide (11) and the sliding sleeve (17) having selector teeth (19);

first and second synchronizing rings (28, 29) each having locking teeth (30, 31) located for engagement with the selector teeth (19) of the sliding sleeve (17), the first and the second synchronizing rings (28, 29) being rotatable relative to the sliding sleeve (17) only over a limited angle of rotation, the first synchronizing ring (28) having a friction surface (24) located on a side thereof remote from the sliding sleeve (17), and the second synchronizing ring (29) having a friction surface (25) located on a side thereof remote from the sliding sleeve (17); and first and second clutch bodies (20, 21) each having coupling teeth (22, 23) located for engagement with the selector teeth (19) of the sliding sleeve (17), the first clutch body (20) having a countercone friction surface (26) for interacting the friction surface (24) of the first synchronizer ring (28) and the second clutch body (21) having a countercone friction surface (27) for interacting the friction surface (25) of the second synchronizer ring (29) whereby, in an engaged state of the clutch, the sliding sleeve (17) is positively connected, via the selector teeth (19) and the coupling teeth (22 or 23), with one of the first and the second clutch bodies (20, 21);

wherein the sliding sleeve (17) has a plurality of grooves (44) and the first and second synchronizing rings (28, 29) each have a plurality of cams (32, 33) distributed about a periphery thereof which engage with one of the plurality of the grooves (44) of the sliding sleeve (17), with clearance, thereby to define the limited angle of rotation, and at least one of the plurality of the cams (32) of the one of the first and second synchronizing rings (28) overlaps an area of the other of the first and second synchronizing rings (29).

2. The clutch (1) according to claim 1, wherein a length of the plurality of cams (32) of the first synchronizing ring (28) are alternatively shortened on a side facing the second synchronizing ring (29) and a length of the remaining plurality of cams (32) of the first synchronizing ring (28) are alternatively lengthened on the side facing the second synchronizing ring (29); and a length of the plurality of cams (33) of the second synchronizing ring (29) are alternatively shortened on a side facing the first synchronizing ring (28) and a length of the remaining plurality of cams (33) of the second synchronizing ring (29) are alternatively lengthened on the side facing the first synchronizing ring (28); and.

3. The clutch (1) according to claim 1, wherein respective ones of the plurality of cams (32) of the first synchronizing ring (28) and respective ones of the plurality of cams (33) of the second synchronizing ring (29) engage with the respective grooves (44) of the sliding sleeve (17) and thus are coupled with one another so that, when engaged with one of the first and second clutch bodies (20, 21), the locking teeth (30, 31) of the first and second synchronizing rings (28, 29) both rotate with one another.

4. The clutch (1) according to claim 3, wherein at least one mating pair of the plurality of cams (32, 33) of the first and second synchronizing rings (28, 29), along part of a width thereof, extend axially into an area of the other of the first and second synchronizing rings (28, 29) and the part of the extending width of the first and the second synchronizing rings (28, 29) form bearing surfaces (34, 35).

5. The clutch (1) according to claim 1, wherein the limited angle of rotation is so confined so that the first and second sychronizing rings (28, 29) are rotatable in only one direction to facilitate movement to the locking position.

6. A clutch (1) comprising:

a sliding sleeve (17) being non-rotatably connectable with a transmission component (3) via at least one guide (11) and the sliding sleeve (17) having selector teeth (19);

first and second synchronizing rings (28, 29) each having locking teeth (30, 31) located for engagement with the selector teeth (19) of the sliding sleeve (17), the first and the second synchronizing rings (28, 29) being rotatable relative to the sliding sleeve (17) only over a limited angle of rotation, the first synchronizing ring (28) having a friction surface (24) located on a side thereof remote from the sliding sleeve (17), and the second synchronizing ring (29) having a friction surface (25) located on a side thereof remote from the sliding sleeve (17); and first and second clutch bodies (20, 21) each having coupling teeth (22, 23) located for engagement with the selector teeth (19) of the sliding sleeve (17), the first clutch body (20) having a countercone friction surface (26) for interacting the friction surface 24) of the first synchronizer ring (28) and the second clutch body (21) having a countercone friction surface (27) for interacting the friction surface (25) of the second synchronizer ring (29) whereby, in an engaged state of the clutch, the sliding sleeve (17) is positively connected, via the selector teeth (19) and the coupling teeth (22 or 23), with one of the first and the second clutch bodies (20, 21);

wherein the sliding sleeve (17) has a plurality of grooves (44) and the first and second synchronizing rings (28, 29) each have a plurality of cams 32, (33) distributed about a periphery thereof which engage with one of the plurality of the grooves (44) of the sliding sleeve (17), with clearance, thereby to define the limited angle of rotation, and at least one of the plurality of the cams (32) of the one of the first and second synchronizing rings (28) overlaps an area of the other of the first and second synchronizing rings (29);

a length of the plurality of cams (32) of the first synchronizing ring (28) are alternatively shortened on a side facing the second synchronizing ring (29) and a length of the remaining plurality of cams (32) of the first synchronizing ring (28) are alternatively lengthened on the side facing the second synchronizing ring (29); and a length of the plurality of cams (33) of the second synchronizing ring (29) are alternatively shortened on a side facing the first synchronizing ring (28) and a length of the remaining plurality of cams (33) of the second synchronizing ring (29) are alternatively lengthened on the side facing the first synchronizing ring (28); and at least one tangential spring 42) is disposed between the plurality of cams (32, 33) in the area of the lengthened cams (32, 33).

7. A clutch (1) comprising:

a sliding sleeve (17) being non-rotatably connectable with a transmission component (3) via at least one guide 11) and the sliding sleeve (17) having selector teeth (19);

first and second synchronizing rings (28, 29) each having locking teeth (30, 31) located for engagement with the selector teeth (19) of the sliding sleeve (17), the first and the second synchronizing rings (28, 29) being rotatable relative to the sliding sleeve (17) only over a limited angle of rotation, the first synchronizing ring (28) having a friction surface 24) located on a side thereof remote from the sliding sleeve (17), and the second synchronizing ring (29) having a friction surface (25) located on a side thereof remote from the sliding sleeve (17); and first and second clutch bodies (20, 21) each having coupling teeth (22, 23) located for engagement with the selector teeth (19) of the sliding sleeve (17), the first clutch body (20) having a countercone friction surface 26) for interacting the friction surface (24) of the first synchronizer ring (28) and the second clutch body (21) having a countercone friction surface (27) for interacting the friction surface (25) of the second synchronizer ring (29) whereby, in an engaged state of the clutch, the sliding sleeve (17) is positively connected, via the selector teeth (19) and the coupling teeth (22 or 23), with one of the first and the second clutch bodies (20, 21);

wherein the sliding sleeve (17) has a plurality of grooves (44) and the first and second synchronizing rings (28, 29) each have a plurality of cams (32, 33) distributed about a periphery thereof which engage with one of the plurality of the grooves (44) of the sliding sleeve (17), with clearance, thereby to define the limited angle of rotation, and at least one of the plurality of the cams (32) of the one of the first and second synchronizing rings (28) overlaps an area of the other of the first and second synchronizing rings (29); and a ring spring is provided between the first and second synchronizing rings (28, 29), and the ring spring engages with a groove provided in a middle region of the sliding sleeve (17) and an external periphery of the ring spring is partially surrounded by the lengthened cams (32, 33).

\* \* \* \* \*